G. P. BRAND.
MECHANICAL WEB GUIDING DEVICE.
APPLICATION FILED MAY 5, 1915.
1,293,014.
Patented Feb. 4, 1919.
5 SHEETS—SHEET 1.
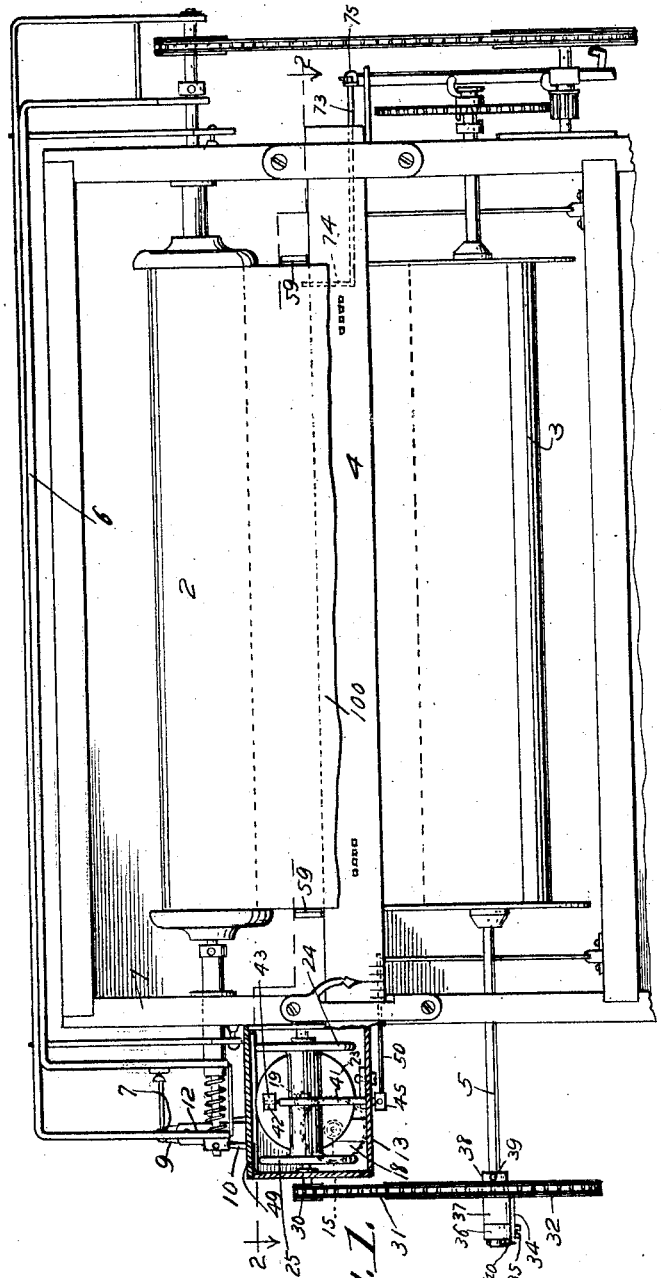
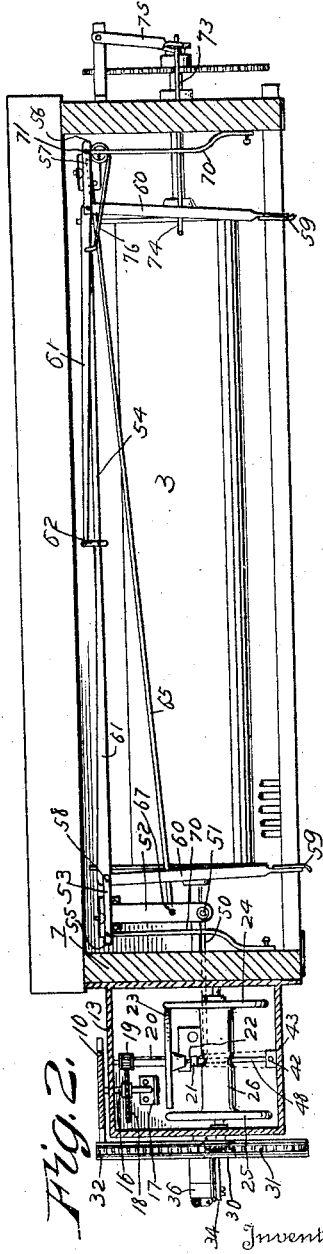
Witnesses
C. D. B. Brown.
Inventor
George P. Brand,
By E. W. Bond
Attorney

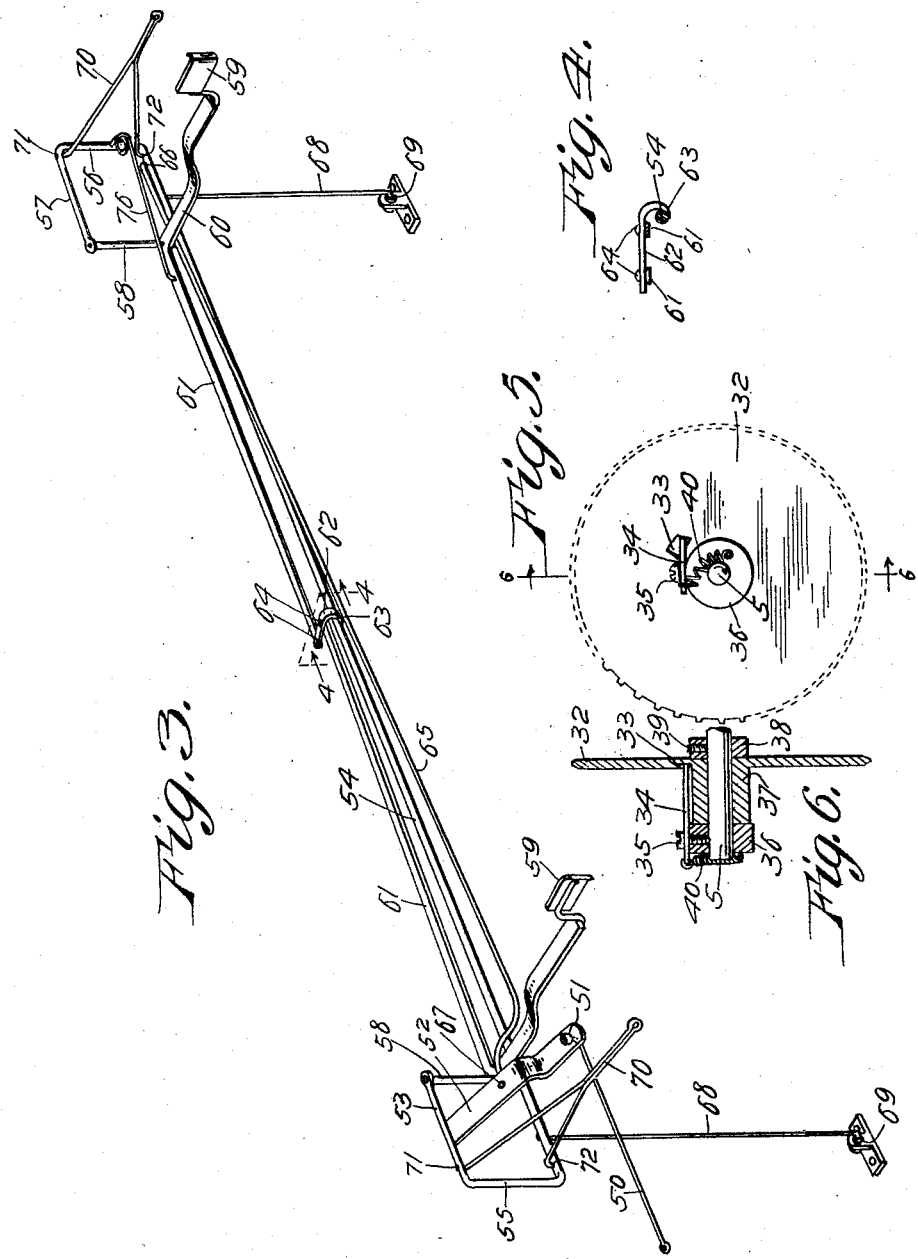

G. P. BRAND.
MECHANICAL WEB GUIDING DEVICE.
APPLICATION FILED MAY 5, 1915.

1,293,014.

Patented Feb. 4, 1919.
5 SHEETS—SHEET 3.

Witnesses

Inventor
George P. Brand,
By
Attorney

G. P. BRAND.
MECHANICAL WEB GUIDING DEVICE.
APPLICATION FILED MAY 5, 1915.
1,293,014.
Patented Feb. 4, 1919.
5 SHEETS—SHEET 4.
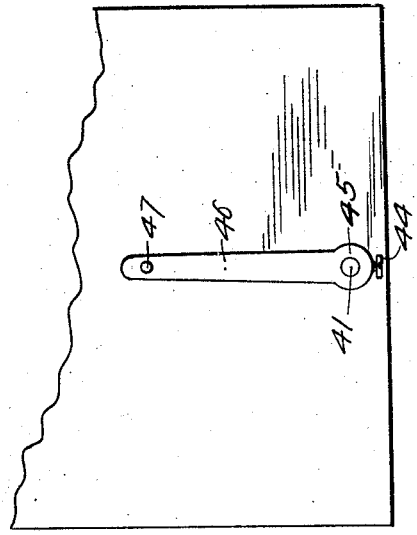
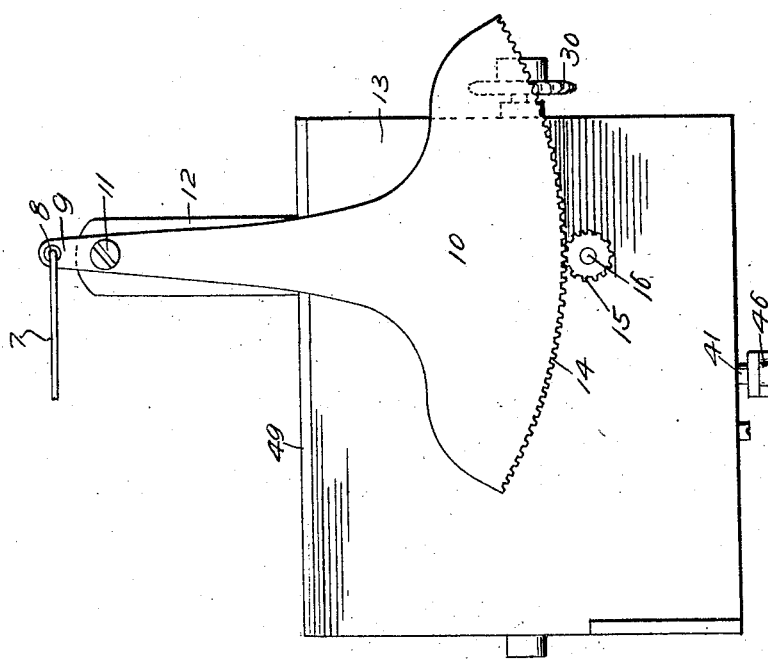
Witnesses
C. O. B. Brown.
Inventor
George P. Brand,
By E. N. Bond
Attorney

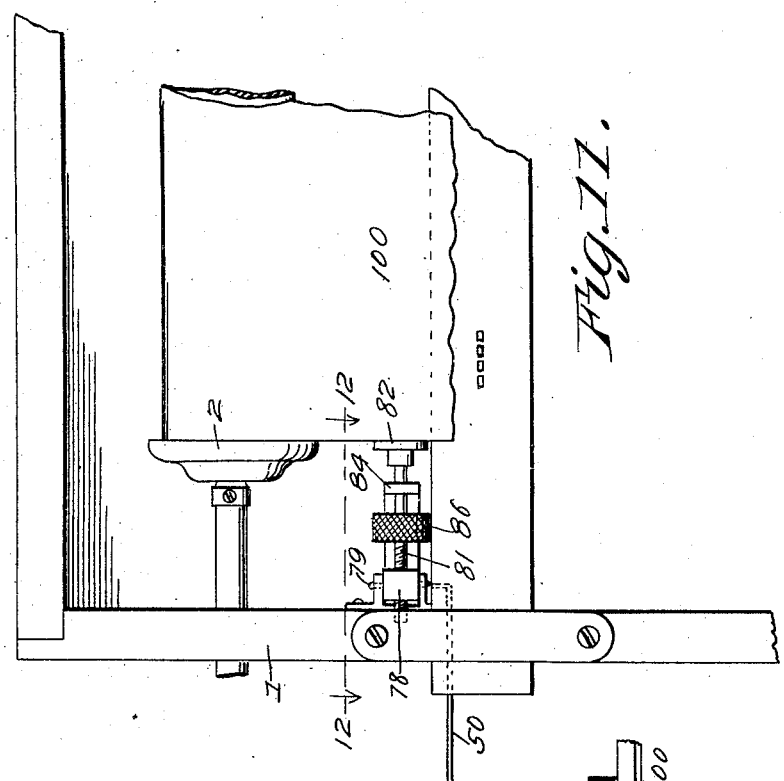
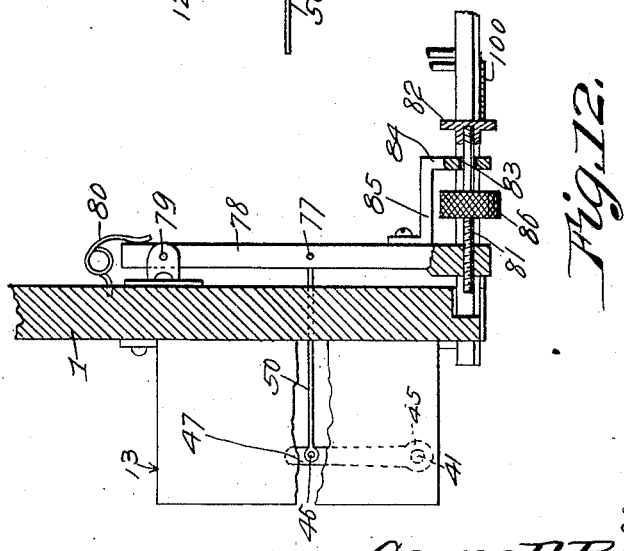

UNITED STATES PATENT OFFICE.

GEORGE P. BRAND, OF NEW YORK, N. Y.

MECHANICAL WEB-GUIDING DEVICE.

1,293,014.             Specification of Letters Patent.      Patented Feb. 4, 1919.

Application filed May 5, 1915. Serial No. 25,979.

*To all whom it may concern:*

Be it known that I, GEORGE P. BRAND, a citizen of the United States, residing at New York, in the county of New York and State of New York, have invented certain new and useful Improvements in Mechanical Web-Guiding Devices, of which the following is a specification.

This invention relates to certain new and useful improvements in means for guiding a web and controlling its lateral deviations, being purely mechanical in its nature and reducing the possibility of lateral deviation of the web to a minimum; in fact, it may be said almost entirely preventing any lateral deviation whatsoever.

The present invention has for its objects among others to provide a simple and efficient, most sensitive device of this nature embodying edge guides so mounted as to move with the greatest freedom, and automatically accommodating themselves to different widths of sheets.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figure 1 is a front elevation with portions broken away, showing my present improvement.

Fig. 2 is a longitudinal section on the line 2—2 of Fig. 1, looking in the direction of the arrows.

Fig. 3 is a perspective detail of the edge guides and their closely associated parts.

Fig. 4 is a sectional detail on the line 4—4 of Fig. 3, looking in the direction of the arrows.

Fig. 5 is an end elevation of the release clutch.

Fig. 6 is a substantially central section through the same.

Fig. 7 is a horizontal section through the casing containing the mechanism controlled by the sheet.

Fig. 8 is a section on the line 8—8 of Fig. 7, looking in the direction of the arrows.

Fig. 9 is a rear view of the box and the oscillating sector.

Fig. 10 is a bottom plan of a portion of the casing containing the sheet controlled mechanism.

Fig. 11 is a detail in front elevation showing a modification, employing a guide at one edge only of the sheet.

Fig. 12 is a section on the line 12—12 of Fig. 11, looking in the direction of the arrows, with portions broken away.

Like numerals of reference indicate like parts throughout the different views.

Figure 8:
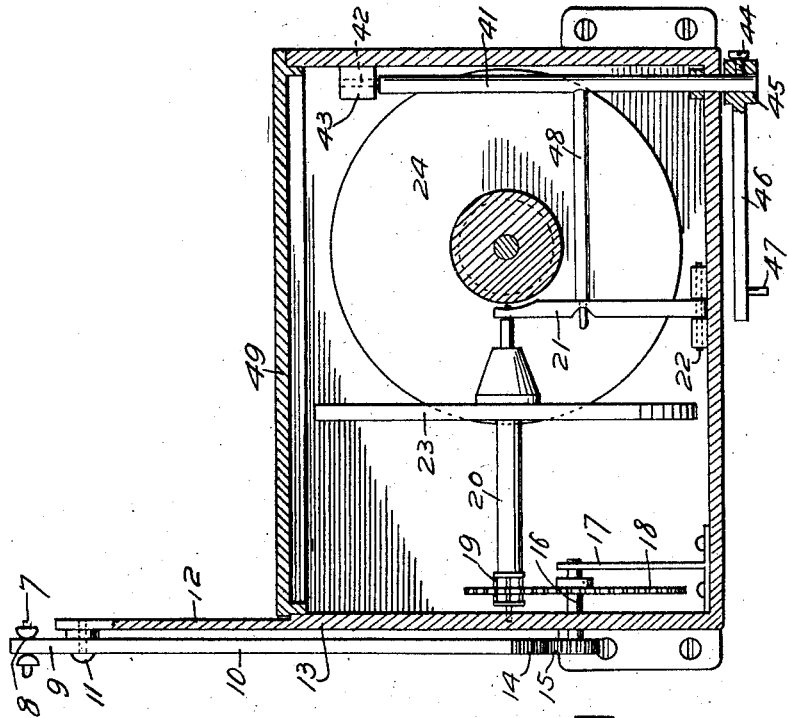

Referring to the drawings in which I have shown only such parts of a mechanical musical instrument as pertain to or are clearly associated with the mechanism constituting my present improvement, 1 is the music spool box, 2 the music spool, 3 the take-up spool and 4 the trackerbar and 5 the take-up spool shaft mounted in suitable bearings in the ends of the music spool box.

Figure 7:
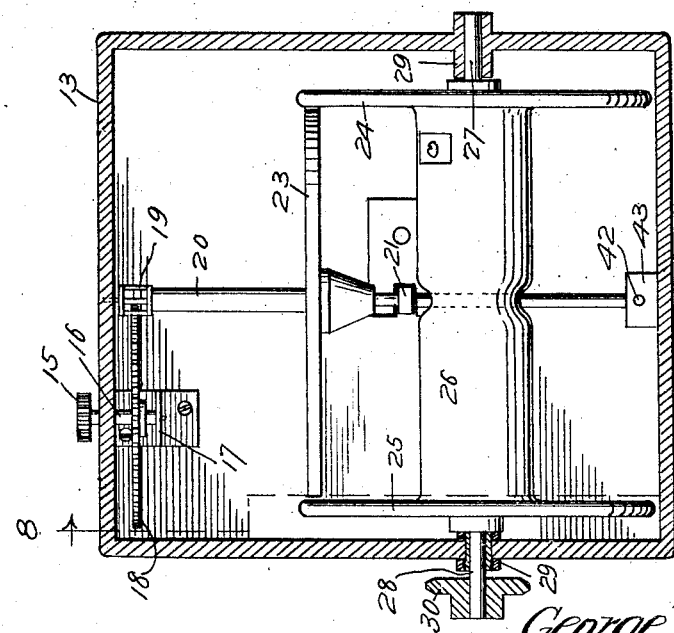

The music spool 2 is carried by and movable with the floating transmission member 6 of any approved form of construction not necessary to describe in detail here. One efficient form of such mechanism is shown and described in my application Serial No. 21,168, filed April 13, 1915. 7 is a rod connected with one of the depending members of the floating transmission device and at the other end connected, as at 8, with the short arm 9 of the sector 10 fulcrumed at 11 on some suitable support, as the upright 12 rising from the dustproof casing 13 which contains the mechanism soon to be described. The lower edge of the sector 10 is toothed, as shown at 14, and meshes with a small gear 15 on the shaft 16 mounted in bearings in the end of the casing 13 and in an upright 17 secured to the bottom of said casing, as seen in Fig. 8. On this shaft 16 is a large gear 18 meshing with a gear 19 of any suitable character carried by the shaft 20 mounted at one end in the end wall of the casing 13 and at the other end in a suitable support 21 rising from the bottom of the casing, the lower end thereof being mounted upon a suitable pivot 22 to allow of the movement of the support 21 necessary for it to permit of the requisite movement of the friction wheel 23 carried by the shaft 20, as will hereinafter appear. The wheel 23 is disposed between the two friction wheels 24 and 25, as seen best in Fig. 7, the periphery of the wheel 23 being designed to contact with either one or the other of said wheels 24 and 25, as the case may be, under conditions which will soon be made clear. In practice, the amount of play or space between the periphery of the wheel 23 and the adjacent face of either of the wheels 24 and 25 will be substantially two one-thousandths of an inch or less, being just sufficient to permit of the slightest degree of movement of the wheel 23 out of contact with either of the wheels 24 and 25 without contacting with the other of said wheels. The wheels 24 and 25 are mounted to move in unison, in the present instance being shown as connected by the enlarged hub 26 to insure sufficient stability, the spindles 27 and 28 of said hub or shaft 26 being mounted in suitable bearings 29 in the walls of the casing 13, as seen best in Fig. 7, and upon an extended end of the pintle 29 is a sprocket wheel 30 around which passes a sprocket chain 31 which passes around a sprocket wheel 32 on the shaft 5 of the take-up spool. The outer face of the sprocket wheel 32 is provided with a depression 33 into which engages a pivoted dog or clutch member 34 pivoted at 35 on a collar 36 secured to the shaft 5, the hub 37 of the sprocket wheel 32 running loosely upon the shaft 5, a collar 38 being provided upon the inner face of the sprocket and secured to the shaft 5 by suitable means, as a screw 39, as shown in Fig. 6. 40 is a spring connected at one end with the collar 36 and at the other end to the dog 34, tending to hold the inner end thereof in contact with the adjacent face of the sprocket 32 and allowing the same to drop into the depression at a predetermined time, as will be hereinafter fully explained.

41 is a vertical shaft within the casing 13 having its upper end provided with a pintle or the like 42 mounted to turn freely within a suitable bearing or the like 43 fixed to the inner face of the casing, as seen in Fig. 8. The lower end of this shaft 41 is shown as extended through the bottom wall of the casing and has secured thereto by suitable means, as, for instance a screw 44, the enlarged portion 45 of the lever 46 which, in the present instance, is shown as provided with a pin or projection 47 for a purpose soon to be described.

The vertical shaft 41 has rigidly secured thereto, the horizontal arm 48, the inner end of which is connected with the support 21 to permit of the necessary vibratory movement thereof without offering resistance, it being understood that this movement is slight, yet some little movement is necessary to permit of the requisite movement; at the same time, the construction must be such that there will be no lost motion.

While it is preferably desirable to inclose the wheels 23, 24 and 25 and the other parts which, in this instance, are shown as inclosed, in order to keep them free from dust and dirt, and to make the cover 49 to the casing readily removable for access to such parts, as seen in Fig. 8, it is to be understood that the present invention is not restricted to the inclosure of such parts.

The pin or projection 47 has connected therewith one end of a rod or link 50 which constitutes a member of the edge guide mechanism, attention being directed to Fig. 3 in which it will be seen that the other end of this rod is suitably connected, as at 51, with a bar or plate 52 rigid with the member or portion 53 of a carriage which, in the present instance, is shown as composed of a rod 54 which extends parallel with the trackerbar to the rear thereof, being bent upon itself at the ends to form the yokes or the like 55 and 56. The members 53 and 57 of the yokes each has pivotally mounted therein one end of a vertical shaft or rod 58, the other ends of which are likewise mounted for rotation in the rod 54, as seen clearly in said Fig. 3. 59 are edge guides, in this form shown as one for contact with each edge of a note sheet. Each guide is carried by a plate or bar 60 which has the substantially right angle extension 61, the same being fixedly secured at the angle to the rod 58 so as to oscillate with said rod, it being understood that the rods 58 are mounted to freely oscillate in their bearings on the rod 54 and the upper members of the yokes.

62 is a plate secured to the overlapped ends of the portions 61, as seen in Figs. 3 and 4, having a downwardly and rearwardly curved terminal 63 for engagement beneath the rod 54 to limit the movement of the edge guides 59 toward each other. The pivots 64 which connect the member 62 with the ends of the portions 61 are mounted for freedom of movement without lost motion so as to permit of easy motion of the members 61. It is to be understood that in the movement of the edge guides, the member 62 has movement in the direction of its length so that the edge guides move in unison.

In order to prevent springing of the plate 52 and the rod 54 and the yokes, I provide a brace 65 connected at one end, as at 66, to the end portion of the rod 54 and at the other end, as at 67, to the said plate 52, all as clearly shown in Fig. 3.

The rod 54 with its yokes and the parts carried thereby, as hereinbefore described, constitute what I term a "carriage," carrying the edge guides. The rod 54, and, consequently, the parts above designated as the "carriage" is mounted for movement lengthwise, or parallel with the direction of the length of the trackerbar by means of the supports 68 attached at their upper ends to the rod 54 substantially midway of the length of the yokes, and at their lower ends mounted to rock or oscillate in suitable bearings, being held, of course, against vertical movement or play so that the carriage as a whole can have the requisite movement in the direction of its length back and forth. Movement of the yokes and, consequently, the carriage to and from the front, as well as against rocking movement transversely of the length of the carriage is prevented by means of the braces 70 secured to the yokes and to some fixed part, as the ends of the music spool box 1, as seen in Fig. 2. The rear ends of the braces 70 are mounted for freedom of movement in the upper and lower bars of the yokes, as seen at 71 and 72 in Fig. 3.

The edge guides are forced toward each other by a spring 76, seen in Fig. 2, secured to one of the yokes and acting upon the portion 61 of the edge guide carrier 60 to force the member 60 toward the other member 60.

With the parts constructed and arranged substantially as hereinbefore described, the operation, briefly stated, is as follows: Normally the edge guides are in their innermost position, that is at their utmost limit toward each other. Upon the rewind, however, the edge guides are at their outermost limit being thrown into such position when the mechanism is placed in position for rewind, being put in such position through the medium of the rod 73 shown in Figs. 1 and 2, the inner end of which is extended upwardly, as seen at 74, to engage the adjacent member 60, as seen in Fig. 2, the rod 73 being connected with the rewind lever 75, so that when the latter is moved into position for rewind the upright portion 74 engaging the member 60 moves the latter to the right and, through the connections hereinbefore described, moves the other edge guide to the left. Normally the upright portion 74 is out of contact with the member 60, as shown in Fig. 2.

As the note sheet 100 is introduced and playing commenced, the contact of the edges of the sheet with the edge guides moves them out in accordance with the width of the sheet, and possibly sometimes with only one edge guide contacting with the sheet. Should only one edge contact, the pressure is brought to bear against the lever 46, forcing the wheel 23 against the wheel corresponding to the contacting edge guide, thus serving to bring the note sheet in the opposite direction and centralizing the sheet and causing the two edge guides to bear against the opposite edges of the sheet. No matter whether one or both of the edge guides are in contact with the edges of the sheet, the edge guides are always central, as is also the mechanism, but the sheet is not central until both edges are in contact with the edge guides, and after the edge guides are once in contact with both edges of the note sheet they never get out of contact therewith during the playing of the piece. The mechanism is so constructed and so delicate in its action that but minimum pressure against the edges of the sheet is required, the pressure being equally divided upon opposite edges of the sheet, and any inclination of the sheet to deviate laterally simply exerts a little pressure against one edge guide or the other and causes the mechanism to respond in either direction, that is, if the sheet presses against the left edge guide, for instance, the mechanism is put in motion and the sheet carried in the opposite direction, that is to the right, thereby relieving pressure upon the left hand edge guide, equaling the pressure, or possibly occasionally applying the pressure to the right hand edge guide which, in turn, reverses the mechanism, causing the sheet to move to the left. This reversal is occurring continually, the sector constantly moving in one direction or the other, whenever the pressure is brought to bear unequally, or when there is more pressure on one edge guide than there is on the other. The sheet deviates not more than two one-thousandths of an inch, because the carriage carrying the edge guide is secured to the lever that causes the reverse movement, and this lever, as well as the wheel 23, has only the slight movement referred to, namely, the two one-thousandths of an inch. When the wheel 23 is in contact with the wheel 24, the sector moves in one direction; when the wheel 23 is in contact with the wheel 25, the sector moves in the opposite direction. When the pressure is equal on both edge guides, the sector remains central and the wheel 23 does not revolve, thereby out of contact with both wheels 24 and 25. This neutral position, however, is of short duration. When the wheel 23 is revolving, no matter in which direction, the sector oscillates in one direction or the other, and through its connection with the transmission mechanism moves the latter music spool to the right or left, thus constantly keeping the sheet in position to be delivered to the take-up spool in a perfect central position, the winds having their edges perfectly even.

After a piece has been played, the parts are set for the rewind, and upon the rewind there is no lateral movement given to the upper transmission mechanism and the music spool as the sprocket wheel on the take-up spool shaft does not revolve, thereby giving no movement to the mechanism controlling the music spool, because the clutch dog 34 does not then engage in the depression in said sprocket wheel. This clutch dog engages in the depression only when the sprocket wheel shaft 5 revolves in the direction of the arrow in Fig. 5. When moving in the opposite direction, the clutch dog rides freely on the face of the sprocket wheel.

In Figs. 11 and 12 I have shown a modified form of mechanism by which I employ a single edge guide. In these views the casing 13 and the mechanism contained therein is the same as that above described, 46 being the lever to its pin 47, there being connected the end of the rod 50, the other end of which is connected, as at 77, with a member 78 pivotally supported, as at 79, on the wall of the music spool box 1, 80 being a spring secured to the said wall and bearing against the said member 78 beyond its pivot, as seen clearly in Fig. 12, to normally force the other end of the said member away from the wall of the box. The outer end of the member 78 has adjustably mounted therein a screw rod 81, the other end of the said screw rod carrying the edge guide 82, the said screw rod being loosely received in an opening 83 in the depending portion 84 of the bracket 85 secured to the member 78. On the rod 81 is a nut or the like 86, rigid with the said screw rod and adapted to be actuated to turn the rod in one direction or the other to adjust the edge guide to centralize the note sheet. After the sheet is once centralized, the results are the same as above described, the member 78 controlling the movements of the lever 46 and, hence, of the sector 10.

In my co-pending application Serial No. 21,165, filed April 13, 1915, I show a mechanical mechanism the reversing friction member of which is supported by the carriage which supports the edge guides. In the present instance it will be noted that the reversing friction member of the mechanical sheet controlling mechanism is supported independently of the edge contacting means.

Modifications in details may be resorted to without departing from the spirit of the invention or sacrificing any of its advantages.

It is to be noted that the friction wheel 23 has its shaft 20 mounted on exceedingly small pintles or bearings so as to reduce to a minimum the friction and allow the wheel to revolve with the greatest freedom. In practice, I employ pintles about the size of a 56 drill.

What is claimed as new is:—

1. Edge contacting means, and a wholly mechanical non-pneumatic sheet controlling mechanism supported independently thereof.

2. Edge contacting means and a wholly friction mechanical non-pneumatic sheet controlling mechanism supported independently thereof.

3. In a device of the character described, mechanical non-pneumatic sheet controlling means embodying friction means under the control of a note sheet, and edge contacting means supported independently of said sheet controlling means.

4. In a device of the character described, wholly mechanical non-pneumatic sheet controlling means embodying friction devices, and edge contacting means supported independently thereof and coöperable therewith.

5. In a device of the character described, edge guides and a wholly friction non-pneumatic control mechanism contained in a dustproof inclosure.

6. In a device of the character described, a wholly friction non-pneumatic control mechanism contained in a dustproof inclosure and an edge guide operatively connected therewith.

7. A wholly friction non-pneumatic control mechanism embodying friction devices and gearing contained in a dustproof inclosure.

8. A wholly friction non-pneumatic control mechanism embodying friction devices, gearing contained in a dustproof inclosure, and an edge guide operatively connected with said mechanism.

9. A wholly friction non-pneumatic control mechanism embodying friction devices and gearing contained in a dustproof inclosure, and a sector operatively connected with said mechanism.

10. A friction control mechanism embodying friction devices and gearing contained in a dustproof inclosure, a sector operatively connected with said mechanism, and a connection therefrom to a transmission mechanism.

11. A friction control mechanism embodying friction devices and gearing contained in a dustproof inclosure, a sector operatively connected with said mechanism, a connection therefrom to a transmission mechanism, and a dustproof inclosure for said mechanism, said sector being disposed outside of said casing.

12. In a device of the character described, a friction controlling mechanism embodying an oscillatory sector and having the shaft of one of its members mounted in an oscillating bearing, said member being supported independently of the edge contacting means.

13. In a device of the character described, a friction control mechanism embodying an oscillatory sector, supporting means for one of the members thereof constructed to allow but infinitesimal movement of the same with relation to the other members, and a controlling lever also mounted for infinitesimal movement, said member being supported independently of the edge contacting means.

14. In a device of the character described, an oscillatory carriage, an edge guide carried thereby and a frictional mechanical non-pneumatic mechanism operatively connected with a member of said carriage the reversing member of said friction mechanism being supported independently of said edge guide.

15. In a device of the character described, an oscillatory carriage, an edge guide carried thereby, a frictional mechanical mechanism operatively connected with a member of said carriage, and gearing interposed between said frictional mechanism and a spool controlling mechanism, the reversing member of said friction mechanism being supported independently of said edge guide.

16. In a device of the character described, an oscillatory carriage, an edge guide mounted for movement therewith, a friction control mechanism and a controlling lever movable therewith and connected with said carriage, the reversing member of said friction mechanism being supported independently of said edge guide.

17. In a device of the character described, an oscillatory carriage, an edge guide mounted for movement therewith, a friction control mechanism, a controlling lever movable therewith and connected with said carriage, the reversing member of said friction mechanism being supported independently of said edge guide, and means for preventing rocking movement of the carriage.

18. In a device of the character described, a friction control mechanism, an oscillatory carriage operatively connected therewith and edge guides mounted on the carriage for movement in unison, the reversing member of said friction mechanism being supported independently of said edge guides.

19. In a device of the character described, a friction control mechanism, an oscillatory carriage operatively connected therewith, edge guides mounted on the carriage for movement in unison, the reversing member of said friction mechanism being supported independently of said edge guides, and means for limiting the movement of the edge guides.

20. In a device of the character described, a friction control mechanism, an oscillatory carriage operatively connected therewith, edge guides mounted on the carriage for movement in unison, the reversing member of said friction mechanism being supported independently of said edge guides, means for limiting the movement of the edge guides, and a spring on the carriage for forcing the edge guides toward each other.

21. In a device of the character described, a carriage having yokes, edge guides mounted thereon for oscillatory movement, means connecting the edge guides, and means coöperable with a member of said carriage to limit the movement of the edge guides.

22. In a device of the character described, a carriage having yokes, edge guides mounted thereon for oscillatory movement, means connecting the edge guides, means coöperable with a member of said carriage to limit the movement of the edge guides, and means for oscillatorily mounting said carriage.

23. In a device of the character described, a carriage having yokes, edge guides mounted thereon for oscillatory movement, means connecting the edge guides, means coöperable with a member of said carriage to limit the movement of the edge guides, means for oscillatorily mounting said carriage, and means movably connected with the carriage and attached to some fixed part to prevent rocking movement of the carriage in a direction transversely to its length.

24. In a device of the character described, a carriage comprising a rod bent at its ends to form yokes, edge guides mounted for oscillatory movement in said yokes and having extensions, and means pivotally connecting the extensions.

25. In a device of the character described, a carriage comprising a rod bent at its ends to form yokes, edge guides mounted for oscillatory movement in said yokes and having extensions, and means pivotally connecting the extensions, said means having a portion engageable with said rod to limit the movement of the edge guides.

26. In a device of the character described, a carriage comprising a rod bent at its ends to form yokes, edge guides mounted for oscillatory movement in said yokes and having extensions, means pivotally connecting the extensions, and a brace for said carriage to prevent springing thereof.

27. In a device of the character described, an edge guide controlled by a note sheet, a transmission mechanism and an interposed non-pneumatic friction control supported independently of the edge guide.

28. In a device of the character described, edge guides controlled by a note sheet, a transmission mechanism, an interposed non-pneumatic friction control supported independently of the edge guides, and intermeshing means.

29. In a device of the character described, edge guides controlled by a note sheet, a transmission mechanism, an interposed non-pneumatic friction control supported independently of the edge guides, intermeshing means, and a casing inclosing said friction control and intermeshing means.

30. In a device of the character described, a transmission mechanism, a friction device controlling the same and mechanically under control of a note sheet, and edge guides supported independently of said friction device.

31. In a device of the character described, a transmission mechanism, a friction device controlling the same and mechanically under control of a note sheet, edge guides supported independently of said friction device, and an inclosure for said friction device.

32. In a device of the character described, an edge guide, a wholly mechanical non-pneumatic sheet controlling means embodying pivotally mounted edge guides, and a friction control supported independently of said edge guides.

33. In a device of the character described, an edge guide, a wholly mechanical non-pneumatic sheet controlling means embodying pivotally mounted edge guides, a friction control supported independently of said edge guides, and a transmission mechanism governed by said friction control.

34. A wholly mechanical non-pneumatic sheet controlling mechanism embodying edge contacting means movable to and from the edges of a note sheet and a friction control device supported independently of said edge contacting means.

35. A wholly mechanical non-pneumatic sheet controlling mechanism embodying edge contacting means movable to and from the edges of a note sheet and a friction control device supported independently of said edge contacting means and automatically reversible.

36. A wholly mechanical non-pneumatic sheet controlling mechanism embodying edge contacting means movable to and from the edges of a note sheet, a friction control device supported independently of said edge contacting means and automatically reversible, and a casing inclosing said friction control device.

37. An oscillatory carriage, edge contacting means carried thereby, and means oscillatorily mounted beneath and supporting said carriage.

38. An oscillatory carriage, edge contacting means carried thereby, means oscillatorily mounted beneath and supporting said carriage, and means extending from said carriage for connection with sheet controlling means.

39. Music sheet edge-contacting means and a wholly mechanical non-pneumatic shifting mechanism supported independently thereof and controlled thereby.

40. A perforated sheet member and means for passing the same from one roll to another, a perforated trackerbar and wholly mechanical means for shifting one of said members relatively to the other of said members for the purpose of maintaining registration between the perforations thereof.

In testimony whereof I affix my signature in presence of a witness.

GEORGE P. BRAND.

Witness:
E. H. BOND.

Copies of this patent may be obtained for five cents each, by addressing the "Commissioner of Patents, Washington, D. C."